July 6, 1937.   H. G. JOHNSTONE ET AL   2,085,910
PERFORATING APPARATUS
Filed Aug. 28, 1923   7 Sheets-Sheet 1

Fig. 1.

Inventors
Harold G. Johnstone
Norbert K. Engst
by  [signature] Att'y.

July 6, 1937.  H. G. JOHNSTONE ET AL  2,085,910
PERFORATING APPARATUS
Filed Aug. 28, 1928   7 Sheets-Sheet 2

Inventors
Harold G. Johnstone
Norbert K. Engst
by  Att'y.

July 6, 1937.   H. G. JOHNSTONE ET AL   2,085,910
PERFORATING APPARATUS
Filed Aug. 28, 1928   7 Sheets-Sheet 6

Inventors
Harold G. Johnstone
Norbert K. Engst
by  N. A. Fatturo  Att'y.

Patented July 6, 1937

2,085,910

UNITED STATES PATENT OFFICE 2,085,910

PERFORATING APPARATUS

Harold Glenn Johnstone, Oak Park, and Norbert Karl Engst, Berwyn, Ill., assignors to Western Electric Company, Incorporated, New York, N. Y., a corporation of New York Application August 28, 1928, Serial No. 302,463

43 Claims. (Cl. 164—113)

This invention relates to perforating apparatus, and more particularly to perforating apparatus especially adapted for perforating cards for use in tabulating systems.

The primary object of this invention is the provision of a perforating machine which may be operated efficiently at high speed and which responds to perforate accurately a sheet in accordance with the communicated information.

Another object of the present invention is the provision of a perforating apparatus having its elements compactly arranged in a relatively small area.

In accordance with the above objects, the present invention contemplates a perforating apparatus especially adapted for recording information in statistical and like cards by perforating apertures in differently allocated areas or zones of the cards. This apparatus includes a key board having a plurality of groups of keys, which groups correspond to the several areas or zones of the statistical and like cards. These keys serve to control the closure of circuits extending to a switching mechanism comprising a plurality of stationary contacts and a brush individual to each set of contacts, which brushes serve to complete electrical circuits through the contacts corresponding to the particular keys which have been operated in the various groups and the associated mechanism to selecting electromagnets embodied in the perforating apparatus.

In one embodiment of the invention, certain groups of the keys are designated as multiplicand and multiplier keys, respectively, on which a given problem may be set up, the product of which is desired to be recorded in an allocated area or zone of the statistical card. The apparatus for obtaining the product of the numerals constituting the multiplicand and the multiplier of the designated problem is described in detail in the copending application of H. G. Johnstone et al., Serial No. 302,462, filed August 28, 1928.

The selecting electromagnets are mounted in an arcuate, staggered relation to permit the location of a plurality of such electromagnets in a relatively small area and are energized in accordance with the depression of the keys of the key board which may condition circuits directly to the switching mechanism and/or which may cause the operation of the multiplying mechanism to function in a manner to obtain the product of a designated multiplicand and multiplier. Individual to each of the selecting electromagnets is a selecting bar which is common to a plurality of perforating pins and which is adapted to be moved positively until it assumes a position in vertical alignment with a desired perforating pin which is determined by the time of operation of the selecting electromagnet. Specifically, the mechanism for effecting the movement of the selecting bars consists of a segmental gear which extends transversely of the selecting bars and which upon being rotated cooperates with a serrated portion of the selecting bars which are selected at different points in the rotation of the segmental gear through the operation of the selecting electromagnets and moved to positions in vertical alignment with the desired perforating pins.

Following the movement of the selecting bars in this manner, mechanical means is operated for causing the downward movement of a ram common to the perforating pins for positively moving the perforating pins selected in accordance with the movement of the selecting bars, thereby causing the numerals set up on the key board or the product resulting from the multiplication of the designated figures to be expressed in the card in the form of perforations or apertures.

In accordance with a specific embodiment of the invention, an unperforated card which is to receive the information in the form of perforations is advanced automatically to a position beneath the perforating pins, which advancement is in synchronism with the operation of the segmental gear which effects the movement of the selecting bars in accordance with their selection, as determined by the operation of the selecting electromagnets. Retraction of the perforated card is also effected automatically upon the restoration of the perforating ram and it is consequently discharged into a hopper designed to receive it.

The above and other features of the present invention will be fully set forth in the following description and appended claims, and will be more readily understood by reference to the accompanying drawings, wherein

Figure 1:
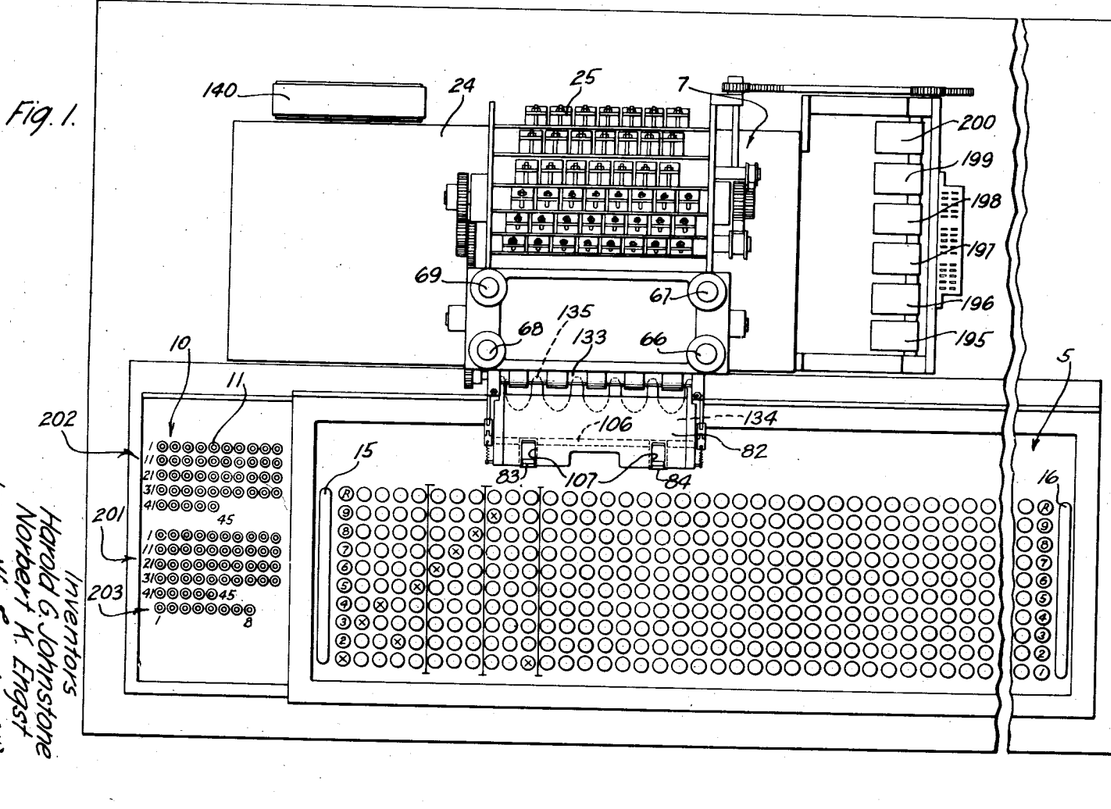
Fig. 1 is a plan view of the apparatus embodying the features of this invention.
Figure 10:
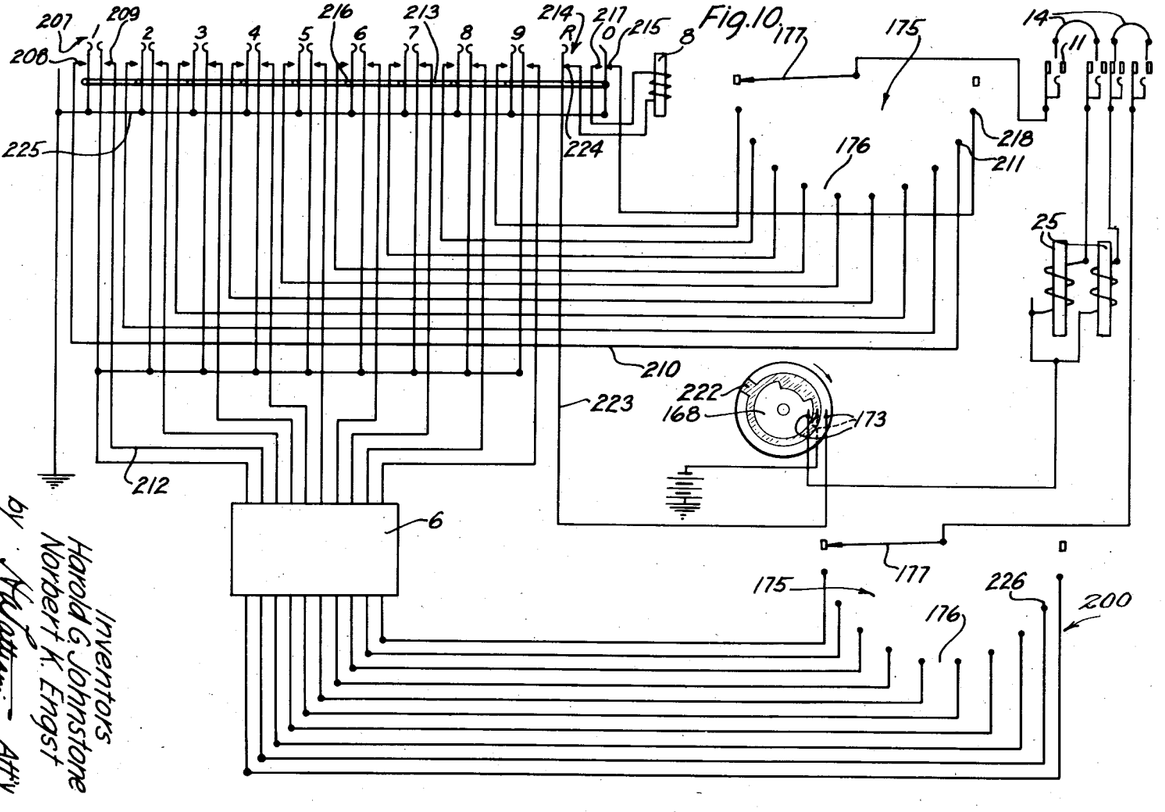
Fig. 10 is a circuit diagram of the electrical connections employed in the operation of the apparatus.

In the practical application of the present invention, the apparatus utilized for the accomplishment of the objects of the invention consists of three principal parts, a key board 5, a computing or multiplying mechanism 6, and a perforating or punching mechanism 7 (Figs. 1 and 10). Each of these just referred to parts of the apparatus embodying the features of this invention has been designated generally by the respective numerals and will be described more in detail later.

Figure 9:
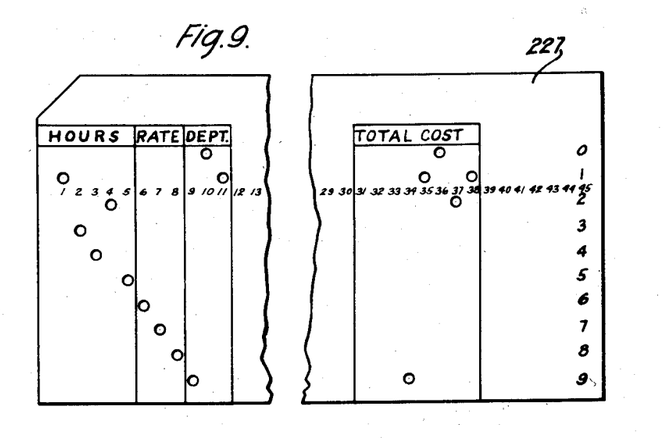
Fig. 9 is a plan view of a statistical record card in which information is expressed in the form of perforations.

Referring now to the key board which is shown in Fig. 1, a plurality of keys are arranged in various groups depending upon the character of the information desired in a statistical card of the character shown in Fig. 9, the keys making up the key board 5 are mounted in strips or rows in a manner similar to that described and disclosed in A. D. Hargan Patent No. 1,378,950, issued May 24, 1921. As disclosed in this Hargan patent, a member common to a plurality of keys is provided for maintaining the keys in an actuated condition once they are depressed. For the purpose of restoring the actuated keys to normal, an electromagnet 8 (Fig. 4) operatively connected to the member common to the keys has its operating winding connected with a suitable control circuit which, when closed, causes its energization and thereby the restoration of the depressed keys to normal. Inasmuch as the details of the key construction do not constitute a part of the present invention, a detailed description of the construction and operation of this part of the mechanism is believed to be unnecessary.

As previously mentioned, the key board 5 is divided into a plurality of groups of keys. Each of these groups of keys controls the operation of contacts indicated generally by the numeral 9 (Fig. 4) which contacts serve to control the closure of electrical circuits to be explained later.

Positioned at opposite sides of the key board 5 are two elongated members 15 and 16 which function to control various starting operations of the apparatus. For example, the member 15 through suitable contacts associated therewith, when depressed, causes the closure of circuits extending to mechanism for setting into operation the computing or multiplying mechanism referred to generally by the numeral 6 (Fig. 10). Likewise, the member 16 serves to control suitable contacts and consequently the closure of electrical circuits extending to apparatus for initiating the operation of the elements constituting the perforating mechanism indicated generally by the numeral 7.

In order that the keys in the various groups of keys may be selectively connected to various other circuits, control mechanism indicated generally by the numeral 10 is provided. This mechanism consists of a plurality of jacks 11 (Fig. 1) designed to receive plugs 12 and 13 which are attached to opposite ends of a flexible cord 14. By means of the flexible cord 14 and the plugs 12 and 13 various combinations of circuits may be established. The purpose and function of such flexible cords will be more fully described in the description pertaining to the operation of the apparatus.

The computing or multiplying apparatus which has been designated generally by the numeral 6 comprises mechanism controlled by the depression of keys in the respective groups of keys set apart for the multiplicand and multiplier for computing the desired problem. For further details regarding the apparatus embodied in the computing or multiplying mechanism reference should be had to copending application of H. G. Johnstone et al., Serial No. 302,462 filed August 28, 1928.

The perforating mechanism comprises a plurality of electromagnets 25 arranged in an arcuate staggered relation to permit the location of a large number of such electromagnets in a relatively small area. Each of these magnets is provided with suitable armatures 26 shown more clearly in Figs. 2 and 3 as being operatively associated with pivoted, bell crank levers 27. According to the preferred embodiment of the invention, the electromagnets 25 are mounted on rectangular shaped members which are secured to side plates 21 and 22 on the arc of a circle and are arranged in a manner such as to permit the ready, easy and quick removal of an electromagnet without disturbing any of the other electromagnets. The axis of the arc on which the rectangular shaped members supporting the electromagnets are mounted corresponds approximately with the pivotal point of the bell crank levers 27. These bell crank levers 27 are pivoted to a rod 28 and are moved from their normal position against the action of a spring 29 individual to each bell crank lever. When the electromagnet is deenergized the spring 29 is effective for quickly returning the associated bell crank lever to normal. In order to accommodate the springs individual to the levers 27 within a given area, two mounting plates 35 and 36 are displaced from each other and are secured to side plates 21 and 22, thereby permitting the springs to be arranged in two rows, as shown in Fig. 3. Individual to each of the levers 27 is a selecting bar 31 which is engaged on its under side by a pin 30 secured to the free end of the bell crank lever 27. The selecting bars have on one surface a plurality of serrations or teeth 32, while on another surface a projection 33 is formed. The end of the bar 31 opposite to that carrying the serrations or teeth 32 is enlarged as indicated by the numeral 34.

The electromagnets 25 upon being energized elevate the bar 31 through the movement of the bell crank lever 27 to a point where the teeth 32 thereof are brought into engagement with a segmental gear 37. This segmental gear 37 is mounted transversely of the selecting bars 31 (Fig. 2) and is secured to a shaft 38 which is journaled in the plates 21 and 22. The shaft 38 (Figs. 2, 3 and 4) carries a gear 39 which is adapted to be oscillated by means of a rack 40 held firmly in engagement with the gear 39 by a flanged roller 41. The rack 40 is secured to an operating bar 41 which has its opposite end secured to one end of a lever 42 which is pivoted at 43. The lever 42 is of the shape shown in Fig. 4 and carries a roller 44 which cooperates with a groove in cam 45 for causing the movement of the operating bar 41 and its associated rack 40 in accordance with the rotation of the cam 45. As is clear from the arrangement of the lever 42 and the cam 45 with which the roller 44 cooperates, the rack 40 will be reciprocated and will consequently impart to the segmental gear 37 through the gear 39 an oscillatory movement. Consequently, when the segmental gear 37 is oscillated in a clockwise direction the selecting bars 31 which have been actuated in accordance with the energization of the electromagnets 25 will be moved to the left, as viewed in Fig. 3. Conversely, when the segmental gear 37 is operated in a counter-clockwise direction the selecting bars 31, which were moved to the left upon the previous oscillation of the segmental gear 37, will be retracted to their normal position.

As previously described, a projection 33 is formed on a surface of the bar 31. This projection normally engages a somewhat similarly shaped portion of a member 46 which extends transversely of the selecting bars 31 and which functions to maintain the selecting bars in engagement with the segmental gear 37 upon their operation by the electromagnets 25 and to disengage the selecting bars from the segmental gear upon their retraction to the position shown in Fig. 3. In further explanation of this operation it will be noted that the under side of the selecting bar 31 has a depressed portion 50 in which the projecting portion of the bar 46 normally rests. When a selecting bar 31 is elevated through the operation of the pivoted bell crank lever 27 and is moved to the left through the oscillation of the segmental gear 37, it will be maintained in operative association with the segmental gear independently of the energization of the associated electromagnet 25, as the surface 51 of the selecting bar 31 now rests on the bar 46. When the selecting bar 31 is retracted due to the oscillation of the segmental gear 37 in a counter-clockwise direction, and when it reaches a position where the groove 50 is in vertical alignment with the bar 46, the lip of the bar 46 will engage the projection 33 and cause the disengagement of the selecting bar 31 from the segmental gear 37.

Figure 8:
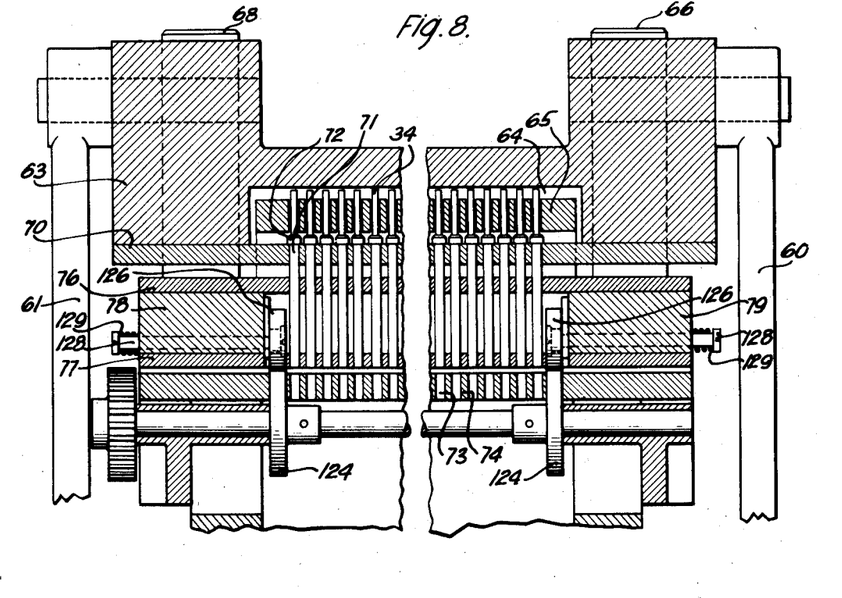
Fig. 8 is a sectional view taken on the line 8—8 of Fig. 3 and shows in section the arrangement of the selecting bars and their associated perforating members.

The cam 45 through which the rack 40 is reciprocated is mounted on a shaft 52 which extends transversely of the machine and which is mounted to depending members 48 and 49 below the shaft 38. Also rigidly secured to the shaft 52 is a cam 53 which is provided with a cam groove 54 which is engaged by a roller 55. This roller 55 is carried by the free end of an arm 56, which is integral with and mounted substantially central to a shaft 57 (Fig. 2), which carries at its extreme ends arms 58 and 59 having connected thereto vertically extending links 60 and 61. Connected to the opposite ends of the links 60 and 61 is a member or ram 63 which extends transversely of and above the enlarged portion 34 of each of the selecting bars 31 and which is reciprocated on vertical guides 66, 67, 68 and 69. As shown in Fig. 8, the member or ram 63 has a recessed portion 64 in which there is positioned a slotted member 65. This member is secured against movement, but the recess 64 is of a depth sufficient to permit a predetermined vertical movement of the member or ram 63.

The ends of the selecting bars 31 having the enlarged portion 34 slide in the slots or grooves formed in the member 65 and are thereby guided when moved to the left or right (Fig. 3) depending upon the direction of rotation of the segmental gear 37. Positioned below the member 65 and secured to and movable with the ram 63 is a plate 70 having apertures arranged to receive perforating pins 71. In the particular embodiment of the invention disclosed in the drawings, the perforating pins 71 are arranged in forty-five rows with ten pins to each row, making a total of four hundred and fifty perforating pins 71. Each of these perforating pins is provided with a shoulder 72 which normally rests on the upper surface of the plate 70. When a selecting bar 31 is moved to the left (Fig. 3) a distance depending upon the time at which it was caused to engage the teeth of the segmental gear 37, a perforating pin in the particular row of perforating pins to which a selecting bar 31 is common will be selected for operation. That is, for each movement of the selecting bar 31 only one of the perforating pins 71 of the row of pins to which that particular selecting bar 31 is common will be selected for subsequent actuation, since the enlarged portion 34 thereof is of such dimension as to cover only one perforating pin 71. The actuation of the selected perforating pin 71 is effected through the downward movement of the ram 63 by the cam surface 54, which causes the perforating pins 71 to be positively depressed into operative association with aligned apertures 73 formed in a die plate 74 which is rigidly mounted to the base plate 24. Interposed between the die plate 74 and the apertured member 70 are two similarly apertured plates 76 and 77 which are secured to opposite faces of blocks 78 and 79 which are supported by the base plate 24. Inasmuch as the apertures in the plates 70, 76 and 77 are in vertical alignment with the apertures in the die plate 74, the perforating pins 71 will be accurately guided. The plate 77 is spaced from the die plate 74 a distance sufficient to allow the passage of a record sheet or card therebetween. When the cam surface 54 reaches a predetermined position in its rotation, arm 56 will be moved downwardly for causing the upward movement of the ram 63. Plate 70 being moved with the ram 63 and being engaged by the shoulders 72 on the perforating pins 71, elevates the actuated perforating pins to the position shown in Fig. 8.

As is clearly shown in Figs. 1 and 3, the machine is provided with an inclined table 82 which is mounted above and substantially central to the key board 5. The table 82 is arranged to receive a record sheet or card which is desired to be perforated in accordance with certain predetermined operations of the keys in the various groups of keys making up the key board 5.

Following the placement of the record sheet or card on the table 82 and synchronously with the operation of the segmental gear 37, mechanism is operated for automatically advancing the sheet or card to a position below the perforating pins 71. This mechanism comprises a pair of oppositely disposed feed fingers 83 and 84 which, upon being moved, engage the sheet or card and positively advance it along the table 82 to a position where it is engaged by positively driven rollers 85 and 86. While the roller 85 is positively driven it is also pivotally mounted at 87 (Fig. 4) and held in operative association with the roller 86 by means of a coil spring 88. The feed fingers 83 and 84 are operated momentarily by means of a leverage arrangement which is reciprocated in synchronism with the oscillation of the segmental gear 37, by a cam 92 which is secured to the cam 53, but on the opposite side to the cam groove 54. Specifically the mechanism for moving the feed fingers 83 and 84 comprises a pivoted lever having arms 93 and 94. To the arm 93 is secured a roller 95 which engages the cam surface of the cam 92 and which upon such engagement causes the movement of a collar 96 which is mounted loosely on a rod 97. Movement of the rod 97 is effected through a collar 98 rigidly secured thereto and a spring 99 which is interposed between the collars 96 and 98. Operatively associated with the arm 94 is an adjustable screw 100 which limits the movement of arm 93 and insures the proper engagement of the roller 95 with the cam 92. Secured to the end of the rod 97 opposite to the end on which the sleeve 96 is loosely mounted is a bar 101 which extends transversely of the table 82 and to which there is rigidly secured a U-shaped member provided with arms 102 and 103. Each of the arms 102 and 103 carries a link 104 which is normally under the tension of a spring 105 and which is secured to a transversely extending bar 106. The feed fingers 83 and 84 are secured to the bar 105, and since the top of the table 82 is slotted at 107 (Fig. 1), the fingers 83 and 84 are capable of being moved upon the movement of the rod 97 and its associated U-shaped member including the arms 102 and 103.

Figure 4:
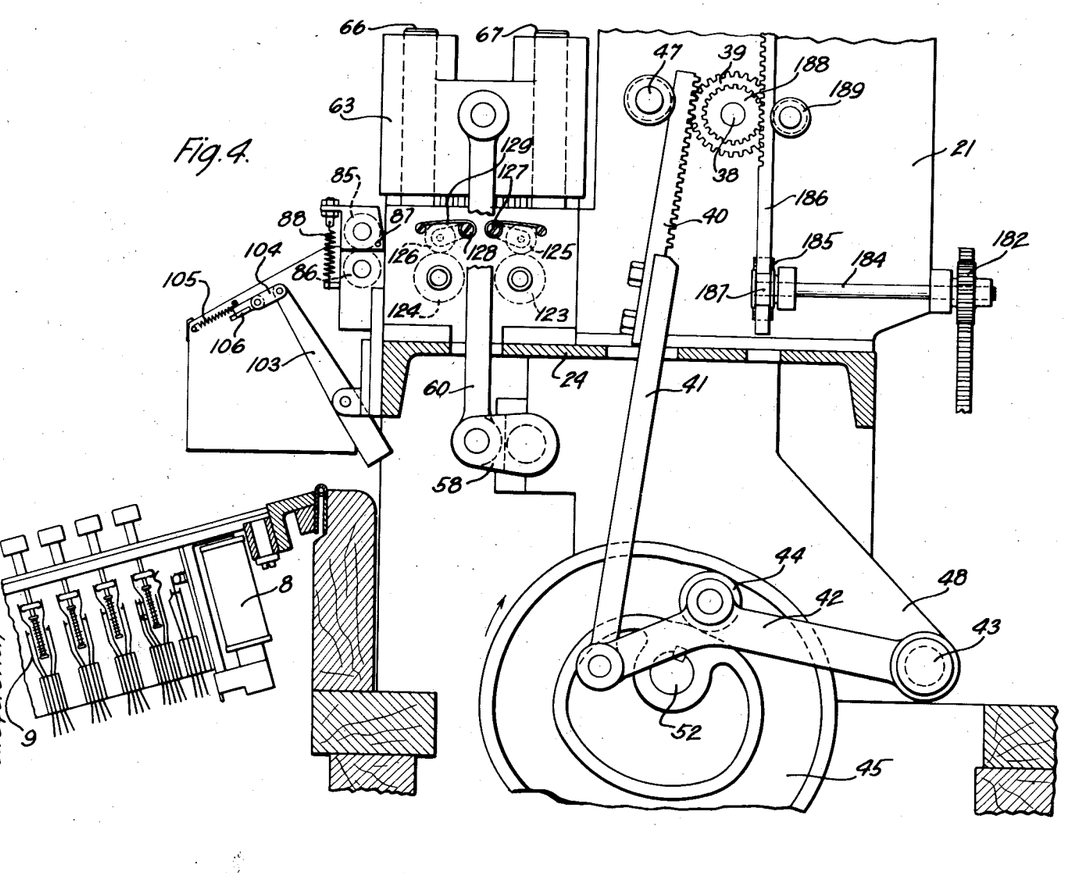
Fig. 4 is also a sectional view taken on the line 4—4 of Fig. 2.

When the feed fingers 83 and 84 are moved in the manner just described, and provided a record sheet or card had been placed on the table 82, it will be advanced to a position where it is engaged by the rollers 85 and 86, after which the feed fingers will be retracted to a position to receive another card. These rollers (Fig. 5) are driven from the shaft 38 which carries the segmental gear 37 through a train of gears consisting of gears 112, 113, 114, 115, 116, 117, 118, 119, 120, 121 and 122. It will thus be seen that the rollers 85 and 86 which are secured to gears 121 and 122, respectively, will be driven through the train of gears just referred to in synchronism with the oscillation of the segmental gear 37 and will, during the movement of this gear in one direction, be rotated in a direction for moving the record sheet or card into alignment with the perforating pins 71, and in an opposite direction for causing the retraction of the record sheet or card upon the rotation of the segmental gear 37 in a direction opposite to that which caused the forward movement of the selecting bars 31. The advancement and retraction of the record sheet or card is also facilitated by means of the rollers 123—123 and 124—124 which are positively driven through gears 117 and 119, respectively, and which are operatively associated with spring pressed rollers 125—125 and 126—126, respectively. As shown in Figs. 4 and 8, the rollers 125 and 126 are interposed between the plates 76 and 77 having a portion thereof projecting through the plate 77 and are pivotally mounted at 127—127 and 128—128, respectively, resilient means 129—129 being provided for holding the respective rollers firmly in contact with the rollers 123—123 and 124—124. The forward movement of the card is arrested by a stop member 131 located between the die plate 74 and the plate 77. Like the rollers 85 and 86, the rollers 123—123 and 124—124 will be rotated first in one direction to advance the card and then in a reverse direction to retract the card in accordance with the oscillation of the segmental gear 37.

As shown in Fig. 1, the rollers 85 and 86 are provided with cut-out portions 133 to permit the mounting of a spring 134 which is formed with projecting portions 135 which extend into the cut-out portions 133 of the rollers 85 and 86. A card in being advanced by the feed fingers 83 and 84 causes the depression of the spring 134 upon its engagement by the rollers 85 and 86. It will thus be apparent that the projections 135 of the spring 134 are directly in the path of the perforated card as it is being ejected and will cause the card to be diverted along a different path than it traversed upon its advancement to be perforated. When the card is deflected by the projections 135 of the spring 134, the edge thereof strikes a surface 137 of spring pressed members 139—139 which cooperates with a surface of member 138 to cause the card to assume a horizontal position on the bottom of a hopper 136, as shown in Fig. 3.

Figures 2, 6:
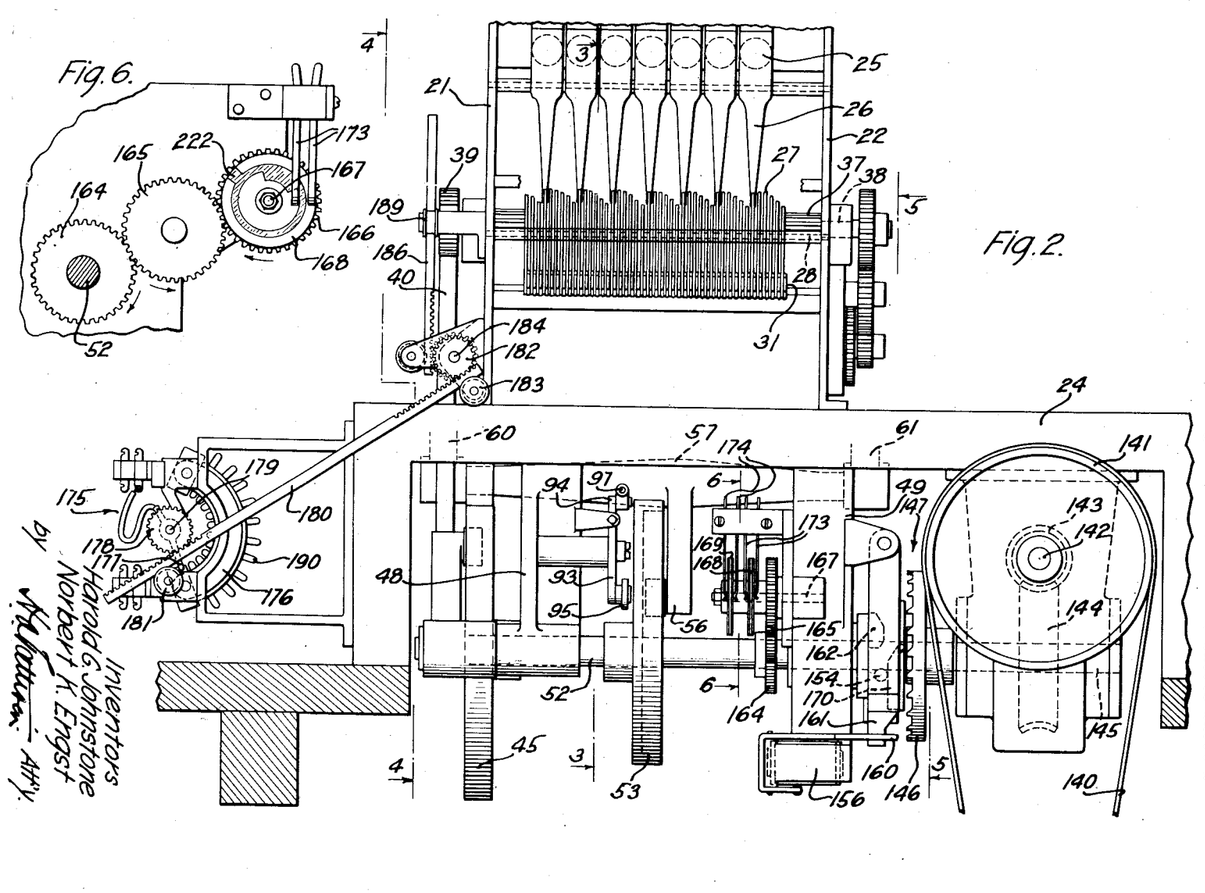
Fig. 2 is a rear elevation of the apparatus shown in Fig. 1.
Fig. 6 is a sectional view taken on the line 6—6 of Fig. 2 showing the arrangement of the gears through which power is communicated to sequence or contact switches.
Figure 3:
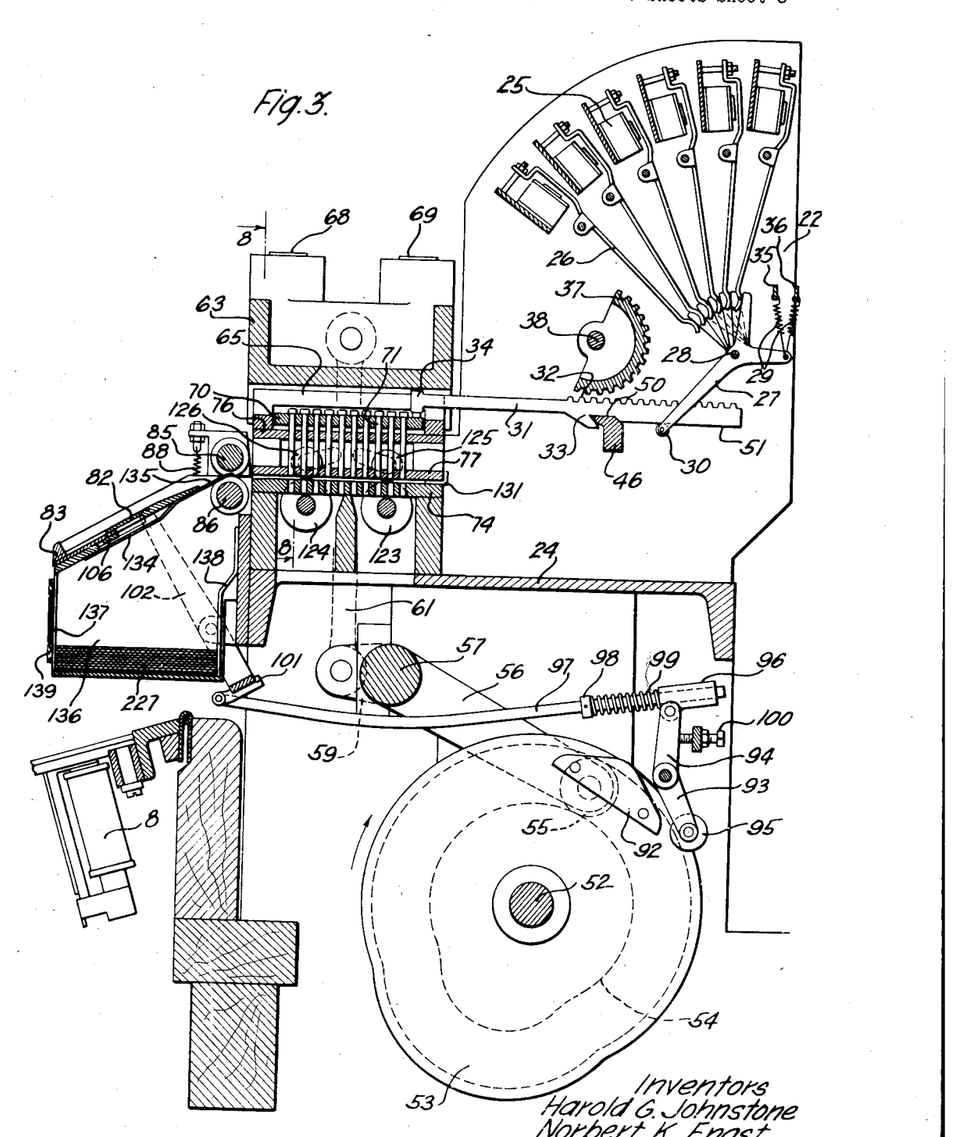
Fig. 3 is a sectional view taken on the line 3—3 of Fig. 2.
Figures 5, 7:
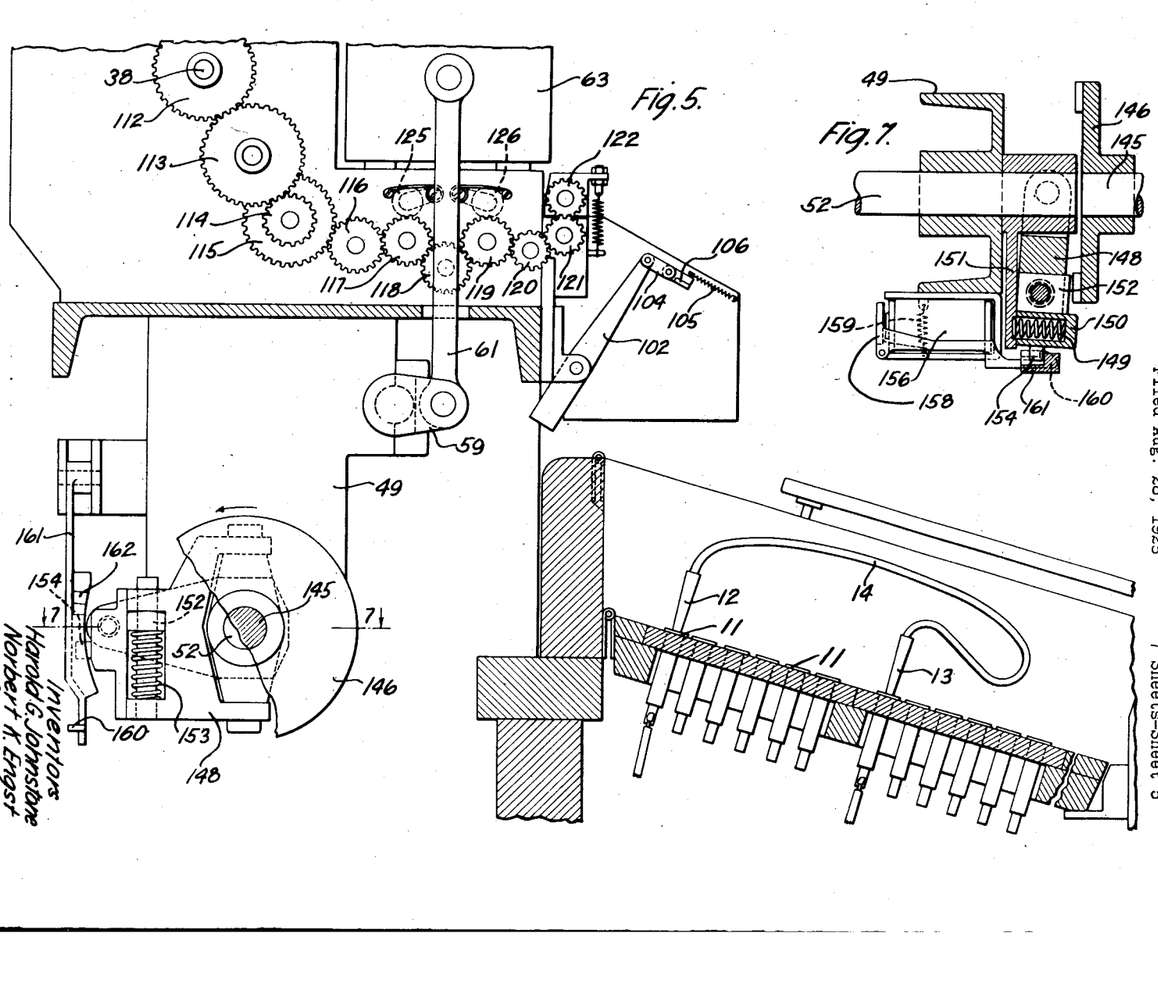
Fig. 5 is a sectional view taken on the line 5—5 of Fig. 2 and shows a part of the clutch operating mechanism and the drive through which power is communicated to the various parts of the apparatus.
Fig. 7 is a sectional view taken on the line 7—7 of Fig. 5.

Power for driving the shaft 52 is communicated from an electric motor (not shown) through a belt 140, and a continuously rotating pulley wheel 141 which is secured to a shaft 142 to which there is also secured a worm wheel 143 (Fig. 2). The worm wheel 143 engages a worm gear 144 which is rigidly secured to a stud shaft 145. Also secured to the shaft 145 is a serrated member 146 of a clutch mechanism designated generally by the numeral 147. Positioned opposite to and on the driven shaft 52, the shaft 145 being referred to as the driving shaft, is a pivoted member 148. The pivoted member 148 is normally urged to the right, as shown in Fig. 7, by a coil spring 149 mounted in a housing 150 in the free end of the pivoted member 148. A projecting portion 151 of a collar secured to the driven shaft 52 forms a base away from which the spring 149 urges the pivoted member 148. The pivoted member 148 has a resilient wedge-shaped member 152 positioned therein and urged in an upward direction (see Fig. 5) by a spring 153. The pivoted member 148 also has a finger 154 at the extreme end thereof opposite the pivot point. The shaft 52 is supported by supporting member 49 upon which is also mounted an electromagnet 156 having an armature 158 which is urged away from the electromagnet by a spring 159. Formed on the end of the armature 158 is a detent 160 which engages a member 161 pivoted on the support 49.

When the electromagnet 156 is energized, the detent 160 will be moved downwardly (Fig. 7) or to the left, as viewed in Fig. 5, thus releasing the pivoted member 161 which, together with the pivoted member 148, will be moved to the right (Fig. 7), by the action of spring 149. Consequently, the wedge-shaped member 152 will be forced to engage the serrated portion of the continuously rotating member 146. Just prior to the completion of the cycle of rotation of the pivoted arm 148, the projecting finger 154 engages a cam surface 162 mounted on the member 161 for causing the spring actuated detent 160 to engage the pivoted member 161 and restrain it against movement to the right, as viewed in Figs. 2 and 7. In the further movement of the finger 154, cam surface 170 is engaged, thereby resulting in the movement of the pivoted member 148 to the left (Fig. 7) and the disengagement of the wedge-shaped member 152 from the serrated portion of the member 145. The elements just described will remain in this position until the subsequent energization of the electromagnet 156.

In addition to the cams 45 and 53, a gear 164 is also mounted on the driven shaft 52. This gear meshes with a gear 165 which in turn meshes with a gear 166 secured to a stud shaft 167 (Figs. 2 and 6). The stud shaft 167 is mounted parallel to the shaft 52 and has mounted thereon at spaced points contact operating members 168 and 169. These contact operating members preferably consist of insulating and contacting portions which in the course of their rotation are operatively associated with contact brushes 173—173 and 174—174, respectively, which are mounted on opposite sides of the respective contact operating members 168 and 169. As will be described more in detail hereinafter, the contact operating members 168 and 169 control the completion of circuits extending from the contact brushes 173 and 174 and specifically function to insure that the electromagnets 25 will be energized only during the forward stroke of the selecting bars 31 and that the actuating keys of the key board 5 and the operated elements of the computing or multiplying mechanism 6 will be restored to normal.

The completion of circuits established through the actuation of the keys in the key board 5 and the elements of the computing or multiplying mechanism 6 is effected to the electromagnets 25 of the perforating mechanism 7 through a switching mechanism indicated generally by the numeral 175. The switching mechanism 175 consists of a plurality of arcuate banks of contacts 176 and a brush 177 individual to each bank of contacts 176. Rotation of the brushes 177 which is in synchronism with the oscillation of the segmental gear 37 is effected through a gear 178 which is secured to shaft 179 upon which the brushes 177 are mounted. A rack bar 180 having teeth at each end cooperates with gears 178 and 182 and is held in this position by flanged rollers 181 and 183. The gear 182 is mounted on a shaft 184 which also carries a gear 185 (Fig. 4). Meshing with the gear 185 are the teeth of a rack bar 186 which are held in operative association therewith by a flanged roller 187. The upper end of the bar 186 has teeth formed at right angles to the surface at which the teeth which engage the gear 185 are formed, which teeth engage a gear 188 which is secured to the shaft 38. Intermeshing of the teeth of the gear 188 and the teeth formed on the upper part of the bar 186 is also effected by means of a flanged roller 189. From this description of the switching mechanism 175 it will be seen that circuits which are connected with contacts 190 will be progressively completed upon the rotation of the brush 177 individual to the bank of contacts including the particular contacts connected with the actuated keys of the key board 5 or the elements of the computing or multiplying mechanism 6 which are at that particular time operated.

In further explanation of the switching mechanism referred to generally by the numeral 175, the small rectangles in the upper right hand corner of Fig. 1 designated by the numerals 195, 196, 197, 198, 199 and 200 are intended to indicate the location of switching mechanism similar to that designated by the numeral 175. However, for the sake of clarifying the drawings the details of the switch mechanism in this particular figure have been omitted. Contained in each of the rectangles 195 to 200, inclusive, are a plurality of arcuate banks of contacts with a rotatable brush individual to each bank of contacts. In the specific embodiment of the invention disclosed there are included in the several banks of contacts a total of five hundred and thirty contacts. Of this number four hundred and fifty are connected to the key board 5 independent of the computing or multiplying mechanism 6, while the remaining eighty contacts are allotted to the computing or multiplying mechanism 6. As previously mentioned, the perforating mechanism includes a total of forty-five electromagnets. These electromagnets are connected to the brushes of the respective switching mechanisms and are energized momentarily upon the passage of the brush individual thereto over a contact in the arcuate bank of contacts which is at that particular instant connected with battery either directly through the contacts of a depressed key of the key board 5 or the operating elements of the multiplying mechanism 6 and the contact controlling switch 168.

It is believed that a clear understanding of the parts of the apparatus described previously will be had from a detailed description of the operation of the various elements embodied in the apparatus. As previously noted, the key board 5 is preferably divided into a plurality of groups of keys, which groups may be allotted to control the perforation of expressions for certain predetermined information. As shown in Fig. 1, the keys are arranged in rows of ten keys each, the upper key in each row being referred to as the repeat key. That is, when it is desired to perforate a second card or other cards in accordance with a previous setting of the key board, the key designated as the repeat key is depressed, which, as will be more clearly explained hereinafter, functions to prevent the release of the previously depressed keys.

Before entering into a detailed description of the operation of the apparatus for a given problem, it will first be explained that the various rows of keys are adapted to control the energization of electromagnets 25. This feature is accomplished by means of groups of jacks designated generally by the numeral 11 and designated specifically by the group numerals 201, 202 and 203 which, for the sake of clearness, will be referred to as the key board jacks, the perforating jacks, and the product jacks, respectively. The group of jacks 201 are connected directly to the contacts of the keys of the key board 5, while the group of jacks 202 are connected directly to the windings of the electromagnets 25, and group 203 are connected directly to the output elements of the multiplying mechanism 6.

Assume now that the first five rows of keys and the next three rows of keys of the key board 5 are allotted to the multiplicand and multiplier, respectively, and that it is desired to perforate in a record sheet or card information expressing the multiplicand and multiplier in the form of perforations in the first eight allotted columns of the record sheet or card. In order that the depressions of the multiplicand and multiplier keys will be indicated in these particular areas of the card, flexible cords 14 are employed for interconnecting the first eight jacks in the horizontal row of jacks 201 with the correspondingly numbered jacks in the group of jacks 202. With such circuits established, the electromagnets 25 of the perforating mechanism will be interconnected with the rotating brushes 177 of the first eight banks of arcuate banks of contacts 195, which contacts are connected directly to the contacts of the keys, as indicated in Fig. 10. Let it further be assumed that it is desired to perforate the card in accordance with certain departmental information such as, for example, the department number, and that the next three rows of keys following the row of keys set apart for the multiplier are allotted to the departmental information. In like manner the keys in the last mentioned rows of keys will be interconnected with the rotating brushes 177 of the last two banks of contacts in the arcuate banks of contacts 195, and the first bank of contacts in the arcuate banks of contacts 196 with the electromagnets 25 by means of the flexible cords 14.

The product resulting from the multiplication of the digits of the multiplicand and multiplier may be perforated in any of the remaining areas of the record sheet or card. Although the keys in the first eleven rows of keys have been described as controlling the perforations in the first eleven columns on the card, these keys may be connected by means of the flexible cords 14 so as to effect the perforation of the information in any column. For the purpose of illustration, columns 31 to 38, inclusive, of the card have been set apart to receive the product. The rows of keys for the various digits of the multiplicand and multiplier have additional contacts which are connected directly, as shown in Fig. 10, to the multiplying mechanism 6, which, in turn, has its operating elements connected to contacts of the first eight banks of contacts in the arcuate banks of contacts 200. These contacts may be interconnected with the electromagnets 25 by the rotating brush 177 individual to the particular bank of arcuate banks of contacts connected to the multiplying mechanism 6 by flexible cords 14 connected to the eight jacks of the group of jacks 203 and the jacks numbered 31 to 38 of the group of jacks 202.

Let it further be assumed that it is desired to compute the cost of the work done by a certain department, for example, a department having the number 901 assigned thereto and whose average rate is six dollars and seventy-eight cents ($6.78) per hour, has done one hundred and thirty-four and one-quarter (134¼) hours work. For this particular problem, the keys indicated with a cross (x) on the key board 5 will be depressed. The depressed keys indicate the multiplicand, the multiplier, and the number of the department, respectively.

In order to bring out more clearly the flexibility of a key board of this type, it will be assumed that it is not desired to compute the cost of the work in thousandths and ten thousandths parts of a dollar. To accomplish this object is necessary to simply connect the jacks 1 to 6 of group 203 to jacks 33 to 38 of group 202, thus dropping the last two decimal points of the product, and shifting the product so that the last denominational column on the card will have perforated therein the one-hundredth part of a dollar in the product.

Referring now to Fig. 10 which shows schematically the circuit connections for one row of keys, this circuit is typical of all of the other rows of keys, excepting those which are not connected with the multiplier 6. As shown in this figure, the contacts of the keys are connected to the contacts of one of the arcuate banks of contacts 176 and the multiplying mechanism 6, which in turn is connected with the contacts of another bank of contacts of the arcuate bank of contacts 176.

In the problem selected for illustration, the key 207 numbered 1, counting from left to right as viewed in Fig. 10, is depressed. The depression of key 207 closes contacts 208 and 209, the contact 208 being connected through conductor 210 to contact 211, of one of the arcuate banks of contacts 176. Contact 209 of the key 207 is connected through conductor 212 to the multiplying mechanism 6. The depression of the key 207 or any of the other keys also causes the bar 213 which is common to all of the keys with the exception of key 214 which is designated as the repeat key, to be moved to the left, as viewed in Fig. 10, for opening contact 215. This operation results due to the location on the bar 213 of pins 216 which are mounted on the left of the respective keys and which are engaged upon the depression of the keys for causing the movement of the bar 213 to the left, resulting in the opening of contact 215 and closing of contact 217. The latter contact is in circuit with the electromagnet 8 which, upon being energized, causes the release of the depressed key in the row of keys to which the electromagnet 8 is common, as described in detail in the aforementioned patent. The operating circuit of the electromagnet 8 extends from battery through the right hand brush 173 (Fig. 2), the conducting plate 222 of contact member 168, and the right hand brush 173 (Fig. 6), momentarily at a predetermined point in the cycle of rotation of the contact member 168, conductor 223, contact 224, winding of the electromagnet 8, contact 217 (closed on depression of any of keys 1 to 9), and conductor 225 to ground. Likewise, circuits similar to those just described will be established upon the depression of the other keys in the respective rows of keys of the multiplicand and multiplier. In the event that there is no key in any of the various rows of keys depressed, contact 215 is maintained closed, which completes the circuit to contact 218 of one of the arcuate bank of contacts 176 associated with that particular row of keys.

It will be noted that there is no zero key provided in the rows of keys on the key board. However, if it is desired to perforate an aperture in the card in the position allocated to zero, no key need be depressed and the perforation of zero will be automatically accomplished through the contacts of the key structure shown diagrammatically in Fig. 10.

Circuits having been established through the depression of the various keys to the multiplying mechanism 6, the elongated member 15 is depressed, which causes the closure of a starting circuit (not shown) extending to the multiplying mechanism 6. Upon the completion of this circuit, the elements of the multiplying mechanism 6 are set in operation and function to compute the product of the particular problem. The multiplying mechanism having performed its function establishes through its elements, circuits extending to contacts in the various banks of arcuate banks of contacts 200. Also assuming that the arcuate bank of contacts shown schematically in Fig. 10, as associated with the multiplying mechanism 6, is the bank of contacts associated with jack numbered 6 of group of jacks 203, the product which will be transmitted by the multiplying mechanism to the jacks 203 will, in this specific instance, be 910.2150. Since this product will be transmitted to jacks 2 to 8, respectively, of group 203, and further since the jacks 7 and 8 which would have transmitted thereto impulses to control digits 5 and 0, respectively, have not been connected to any of the group of jacks 202, these digits will not be perforated in the card due to this break in the circuit. However, since jack numbered 6 of group 203 has been connected to jack 38 of group 202 by means of the connecting cord 14, the contact 226 will have ground supplied thereto by the multiplying machine. Likewise, contact 211 of another bank of arcuate banks of contacts 176 will be connected to ground but directly through contact 208 of the key 207. In the case of the departmental information, the keys in the rows of keys allotted thereto will establish corresponding circuits to other banks of arcuate banks of contacts 176.

The circuits from the depressed keys and the multiplying mechanism 6 to the various contacts in the several banks of arcuate banks of contacts 176 having been established, elongated member 16 is depressed. The depression of this member completes a circuit (not shown) to the electromagnet 156 which upon being energized actuates detent 160 which allows the member 161 and the pivoted member 148 to move to the right, as viewed in Fig. 7. The movement of the pivoted member 148 causes the wedge-shaped member 152 to engage a serration in the continuously rotated member 146. Consequently, power is communicated to the shaft 52 from the continuously driven shaft 145, through the serrated member 146 and the pivoted member 148. The shaft 52 in rotating carries with it cams 45 and 53 and gear 164.

The cam 45, as described in detail, actuates the pivoted lever 42 which causes the reciprocation of rack 40 through the operating bar 41. Oscillation of the gear 39 is thereby effected for causing the corresponding oscillation of the segmental gear 37. Synchronously with the oscillation of gear 39, gear 188 which is secured to the same shaft is oscillated for causing the reciprocation of rack bar 186 and rack bar 180 which, through gear 178, rotates shaft 179 on which the brushes 177 individual to the respective banks of arcuate banks of contacts 176 are mounted. As the brushes 177 pass over the first contacts in each of the banks of arcuate banks of contacts, a circuit will be established to the electromagnet 25 of the perforating mechanism 7, provided ground was previously connected to those particular contacts of the arcuate banks of contacts. However, the completion of the circuits to the electromagnets 25 is controlled by contact switch 168 which is rotated through gear 164 and which connects all of the electromagnets 25 with battery for approximately 150 degrees of its rotation through the right hand brush 173 (Fig. 2), the conducting plate 222 of switch 168, and the left hand brush 173 (Fig. 6).

In the particular example selected for illustration, ground was connected to contacts 211 and 226, which contacts are in different banks of arcuate banks of contacts 176. Consequently, when the brush 177 of these banks of contacts engages contacts 211 and 226, circuits will be momentarily established to the electromagnets 25 which are connected through flexible conductors 14 to the brushes individual to these banks of contacts. The electromagnets 25 upon being energized cause the operation of bell crank levers 27 for elevating the selecting bars 31 individual thereto into contact with the segmental gear 37. The segmental gear 37 now being rotated causes the movement of the selecting bars 31 to the left until they are in vertical alignment with the second perforating pins 71 of the respective rows of perforating pins (Fig. 3). The movement of the selecting bars 31 to the second position is due to the fact that the segmental gear 37 has substantially completed its oscillation in a clockwise direction and due to the fact that the brushes 177 have previously passed over eight contacts 190.

In the specific problem stated hereinbefore for figuring the cost of certain work, the brushes 177 in passing over the contacts 190 will first energize the electromagnets 25 controlling the selector bar 31 associated with the 9th and 34th row of perforating pins 71 and will thereafter, at regular intervals, energize successively the electromagnets 25 which control the selector bars 31 associated with the 8th, 7th, 6th, 5th, 3d, 2nd rows, the 4th and 7th rows simultaneously, the 1st, 11th, 35th and 38th rows simultaneously, and the 10th and 36th rows simultaneously. Upon the actuation of these electromagnets 25, as pointed out hereinbefore, the selecting bars 31 will be drawn into engagement with and driven forward by the segmental gear 37, and since the electromagnets 25 controlling the 9th and 34th rows of perforating pins are actuated first, the selecting bars associated therewith will be drawn forward the greatest distance. The other selecting bars will be moved through a distance corresponding to the point in the rotation of the segmental gear 37 at which the electromagnets 25 individual thereto are energized.

During the forward movement of the selecting bars 31, cam 53 is also rotating and brings cam 92 into operative relation with roller 95 which, through rod 97 and its associated elements moves a card 227 engaged by the feed fingers 83 and 84 into association with the rollers 85 and 86 which rollers engage the card and advance it to a position where it is engaged by the rollers 123 and 124. These latter rollers advance the card 227 to a position against a stop 131. Shortly after the movement of the fingers 83 and 84, cam groove 54 of the cam 53 is rotated to a position where the roller 55 is effective to elevate arm 56. The elevation of the arm 56 causes the downward movement of the ram 63, and since the selecting bars 31 are now in their selected position, the perforating pins 71 on which the enlarged portion 34 of the selecting bars 31 rests, will be depressed to cause the card 227 positioned between the die plate 74 and the plate 77 to be perforated as shown in Fig. 9. Upon the continued rotation of the cam 53 and due to the shape of the cam groove 54, the arm 56 will be moved downwardly, causing the upward movement of the ram 63 which carries with it the apertured plate 70 and the depressed perforating pins 71. Further retraction of the perforating pins 71 is prevented due to the slotted member 65.

At this point in the cycle of operation the cam 45 is in a position where the rack 40 is being moved downwardly, resulting in the oscillation of the gear 39 and the segmental gear 37 in a counter-clockwise direction. Consequently, those selecting bars 31 which were moved to the left, as viewed in Fig. 3, will be moved to the right and will be caused to assume the position shown in this figure by the lip of the bar 46. The perforated card 227 is, during the oscillation of the segmental gear 37 in a counter-clockwise direction, moved from beneath the perforating pins 71 due to the rotation of the rollers 123 and 124 in a counter-clockwise direction. Due to the location of the projections 135 of the spring 134, the perforated card 227 will be deflected into the hopper 136. Also synchronously with the oscillation of the gear 39 the gear 178 is oscillated in a direction to restore the brushes 177 of the several banks of arcuate banks of contacts 176 to normal.

Just subsequent to the time the selecting bars 31 reach the extreme point in their movement to the left (Fig. 3), contact switch 169 is effective for causing the release of the operating elements of the multiplying mechanism 6. Also following the opening of the circuits to the electromagnets 25 and about the same time that the contact switch 169 is effective, contact switch 168 completes a circuit extending to the electromagnets 8 of the various rows of keys in the key board 5. Provided the repeat key 214 has not been depressed, the electromagnets 8 will be energized over a circuit previously traced, causing the restoration of the depressed keys.

Inasmuch as the previously depressed keys have been returned to normal, the machine is in readiness to receive a new problem. Feed fingers 83 and 84 being at that time in their retracted position or the position shown in Fig. 1, an unperforated card may be associated therewith for subsequent advancement to a position where it will be perforated. The operator may now depress the desired keys in accordance with the new problem to be computed, the product of which will be perforated in the card now positioned on table 82.

Just previous to the completion of the cycle of rotation of the shaft 52, the finger 154 engages the wedge-shaped surfaces 162 and 170 for restoring the detent 160 to normal and disengaging the wedge-shaped member 152 from the serrations of the member 146, thereby stopping shaft 52 and its associated mechanism.

What is claimed is:

1. A perforating apparatus comprising a plurality of groups of perforating members, electromagnetically controlled selecting means associated with each group, a plurality of sets of contacts in which information to be recorded is stored, means for closing predetermined contacts to establish electrical circuits for controlling the operation of the selecting means, means normally out of engagement with and common to all the selecting means for advancing the selecting means into operative association with the perforating members, and means for causing the selecting means to actuate the perforating members.

2. In a perforating apparatus, a plurality of sets of perforating members, selecting means associated with each set, a plurality of electromagnets for conditioning the selecting means for subsequent operation, means for actuating said selecting means, a plurality of control means for governing the operation of said electro-magnets, and means operative to permit any of the control means to control any electro-magnet.

3. A perforating apparatus comprising a plurality of perforating members, selecting elements associated therewith, means including a plurality of contacts and brushes to establish circuits through electro-magnets for selectively operating the selecting elements, means operative thereafter for positively advancing the selected elements into operative association with the perforating members, and means for causing the selecting elements to actuate the perforators.

4. A perforating apparatus comprising a plurality of perforating members, selecting elements associated therewith, means including a plurality of electro-magnets for selectively operating the selecting elements, mechanically operated means for advancing the selected elements into operative association with the perforating members, and control means for governing the operation of said electro-magnets.

5. In a perforating apparatus, a plurality of sets of perforating members, selector bars individual to each set of perforating members and having serrated portions on a surface thereof, a segmental gear common to all the selector bars, means for causing relative movement between the selector bars and the segmental gear at varying periods, and control means for determining the period at which said last mentioned means will operate.

6. In a perforating apparatus, a plurality of perforating members, cyclically operative selecting means comprising a plurality of selector bars for controlling the operation of the perforating members, actuating means therefor, means including a plurality of electro-magnets for connecting the selector bars to the actuating means, means for selectively energizing the electro-magnets, and means for rendering the electro-magnets ineffective for a predetermined portion of the cycle of operation of the selecting means.

7. In a perforating apparatus, a plurality of perforating members, means for actuating said perforating members, means for determining the members to be actuated comprising a segmental gear, selector bars having serrated surfaces adapted to engage the segmental gear, elements operable momentarily for moving the selector bars into engagement with the segmental gear, means for subsequently holding the selector bars in engagement with the segmental gear, a selecting switch for controlling the elements, and means for moving the selecting switch and the segmental gear in synchronism.

8. In a perforating apparatus, a plurality of perforating members, selecting means associated therewith for determining their operation, means for conditioning for operation said selecting means, means for moving said selecting means through varying distances dependent upon the moment when the conditioning means operates, and means for actuating the conditioned ones of said selecting means.

9. In a statistical system card perforating apparatus, a plurality of perforating members, means for causing the actuation thereof, elements rotatable in one direction to move a card into association with the perforating members and rotatable in a reverse direction to move the card in a reverse direction, and means cooperating with said elements to deflect the card on its movement in a reverse direction.

10. In a perforating apparatus, a plurality of perforating members, means for actuating said perforating members and for determining the members to be actuated including selecting means, means for moving said selecting means through varying distances, means for controlling the movement of said selecting means including elements operable momentarily for bringing the selecting means into operative association with the means for moving said selecting means, and means for subsequently holding the selecting means in operable association therewith for an interval dependent upon the moment of operation of the elements.

11. In a perforating apparatus, a plurality of groups of perforating members, selecting means associated with each group for determining the perforating member to be operated in each group, elements for conditioning for operation said selecting means, means for actuating the conditioned ones of said selecting means, and a plurality of electrical control means for governing the operation of said elements.

12. A perforating apparatus comprising a plurality of groups of perforating members, a selecting element associated with each group, means including a plurality of electromagnets for selectively operating the selecting elements, means for actuating the selected elements into operative association with the perforating members, a plurality of control means for governing the operation of said electromagnets, and means for permitting any of the control means to control any electromagnet.

13. In a perforating machine, a plurality of perforating members, selecting means associated therewith, a plurality of electromagnets for conditioning the selecting means for operation, means for actuating said selecting means, a plurality of control elements for governing the operation of said electromagnets, means for permitting any of the control elements to control any of the electromagnets, and means for supporting the electromagnets in a radial staggered formation.

14. In a perforating apparatus, a plurality of perforating members, means for actuating certain of said perforating members and for determining the members to be actuated including a segmental gear, selector bars having serrated top surfaces adapted to engage the segmental gear, elements for moving the selector bars into engagement with the segmental gear, and a selecting switch for controlling the operation of said elements, and means for moving the selecting switch and the segmental gear in synchronism.

15. In a perforating apparatus, a plurality of sets of perforating members, a selecting member associated with each set for determining the perforating member to be operated in the set, means cooperating therewith for effecting the operation of the selected members, a plurality of groups of control members for governing the operation of the selecting means, means for returning the control members to normal after the operation of the perforating members, and means individual to each group of control members for rendering said last mentioned means inoperative with respect thereto.

16. In an apparatus for effecting perforations in a card, a plurality of perforating members, means for selecting and actuating said perforating members, a support for the card to be perforated, a hopper for cards which have been perforated, elements rotatable in one direction for advancing a card from the support into association with the perforating members and rotatable in a reverse direction to retract the cards out of association with the perforating members, and means cooperating with said elements to deflect a card which has been perforated into said hopper.

17. In a perforating apparatus, a plurality of perforating members, means for actuating said perforating members and for determining the members to be actuated including a segmental gear, selector bars having serrated surfaces adapted to engage the segmental gear, elements operable momentarily for moving the selector bars into engagement with the segmental gear and means for subsequently holding the selector bars in engagement with the segmental gear.

18. A perforating apparatus comprising a plurality of perforating members, selecting elements associated therewith, means including a plurality of electromagnets for selectively operating the selecting elements, means operative after the electromagnets have operated for positively advancing the selecting elements into operative association with the perforating members, a plurality of control means for controlling the operation of the electromagnets, and means for causing the selecting elements to actuate the perforators, said means for positively advancing the selecting elements being operated each time the last mentioned means operates.

19. A perforating apparatus comprising a plurality of perforating members, selecting elements associated therewith, means including a plurality of electromagnets for selectively operating the selecting elements, means operative after the electromagnets operate for positively advancing the selecting elements into operative association with the perforating members, perforator actuating means, said means for operating the selecting elements being operated each time the perforator actuating means operates, a plurality of control means for controlling the operation of the electromagnets, and means whereby any of the control means may control any electromagnet.

20. In a perforating apparatus, a plurality of perforating members, selecting elements associated therewith, perforator actuating means, means including a plurality of electromagnets for selectively operating the selecting elements, contact making means for controlling the time of operation of the electromagnets, and means operative after the electromagnets operate for positively advancing the selecting elements into operative association with the perforating members each time the perforator actuating means operates.

21. A perforating apparatus comprising a plurality of perforators, selecting elements associated therewith, perforator actuating means, means including a plurality of electromagnets for selectively operating the selecting elements, means operative after the electromagnets operate and each time the perforator actuating means operates for positively advancing the selecting elements into operative association with the perforators, and an electrically operated control means for controlling the operation of the electromagnets.

22. A perforating apparatus comprising a plurality of perforating members, selectors for actuating the perforating members, means for advancing the selectors into association with the perforating members, and means for causing a relative movement between the selectors and the advancing means comprising a plurality of electromagnets, means for energizing the electromagnets momentarily, and control means for determining the moment of energization of the electromagnets.

23. A perforating apparatus comprising a plurality of perforating members, selecting members for actuating the perforating members, means for advancing the selecting members into association with the perforating members, and means for causing a relative movement between the selecting members and the advancing means comprising a plurality of electromagnets, means for energizing the electromagnets momentarily, control means for determining the moment of energization of the electromagnets, and means interconnecting any of the control means with any electromagnet.

24. In a perforating apparatus, a plurality of rows of perforating members, selector bars associated with each row of perforating members, means for advancing the selector bars into association with a perforator in their respective rows, a ram for simultaneously actuating the advanced selector bars to cause them to actuate their associated perforating members, means for moving the selector bars into engagement with the advancing means, and means for controlling the operation of the selector bar moving means.

25. In a perforating apparatus, a plurality of sets of perforating members, selector bars individual to each set of perforating members and having serrated portions on a surface thereof, a segmental gear common to all the selector bars, means for causing relative movement between the selector bars and the segmental gear in a radial direction with respect to the gear, and control means for determining the instant at which said last mentioned means will operate comprising means for momentarily rendering effective the means for causing a relative movement.

26. A perforating apparatus comprising a plurality of perforating members, selecting elements individual to groups of the perforating members, means including a plurality of electromagnets for selectively operating the selecting elements to select predetermined perforating members from the plurality thereof, and control means for governing the instant of energization of the electromagnets including a plurality of groups of electrical contacts, means for connecting a source of electromotive force to any of the contacts, a brush associated with each group of contacts and adapted to complete a circuit to the electromagnet upon engaging a contact connected to the source of electromotive force.

27. In a perforating apparatus, a plurality of perforating members, means for actuating said perforating members, means for determining the members to be actuated comprising a segmental gear, selector bars having serrated surfaces adapted to engage the segmental gear, elements operable momentarily for moving the selector bars into engagement with the segmental gear, means for subsequently holding the selector bars in engagement with the segmental gear, a selector switch having movable and stationary contacts for controlling the elements, means for moving the movable contacts and the segmental gear in synchronism, and control means for governing the operation of the selector switch including a key operated switchboard.

28. In a perforating apparatus, a plurality of perforating members, means for actuating said perforating members, and means for determining the members to be actuated comprising selecting means, means for moving said selecting means through varying distances, means for controlling the movement of said selecting means including elements operable momentarily for bringing the selecting means into operative association with the means for moving said selecting means, means for subsequently holding the selecting means in operable association therewith for an interval dependent upon the moment of operation of the elements, and means including two different types of mechanism for governing the operation of the control means.

29. A perforating apparatus comprising a plurality of perforating members, selecting members for actuating the perforating members, means for advancing the selecting members into association with the perforating members, and means for causing the selecting members to be moved into engagement with the advancing means comprising a plurality of electromagnets, means for energizing the electromagnets momentarily, and control means for determining the instant of energization of the electromagnets.

30. A perforating apparatus comprising a plurality of perforating members, means for actuating the perforating members including selecting members, means common to all of the selecting members for advancing them into association with the perforating members, and means for moving the selecting members into engagement with the advancing means including a plurality of electromagnets.

31. In a mechanism for marking sheets with information, a plurality of marking members, a plurality of elements for selecting the marking members to be rendered effective, means for moving predetermined selecting elements into effective position with predetermined marking members, means for momentarily bringing the selecting elements into operative association with the moving means, means for subsequently holding the selecting elements in operative association with the moving means for an interval dependent upon the moment of operation of the selecting elements, and means for actuating the selecting elements and associated selected members to mark the information in a sheet.

32. In a mechanism for marking sheets with information, a plurality of marking members, a plurality of selecting elements, means for moving predetermined selecting elements into effective position with predetermined marking members and for retracting the selecting elements to normal position, means for momentarily bringing the selecting elements into operative association with the said moving means, and means for subsequently holding the selecting elements in operable association with the moving means for predetermined intervals and for positively disengaging the selecting elements therefrom upon their retraction to normal position.

33. In a mechanism for marking sheets with information, a plurality of marking members, a plurality of selecting elements, means adapted to advance predetermined selecting elements into operative association with predetermined marking members, electrically controlled means for moving the predetermined selecting elements into engagement with the advancing means, means for actuating the electrically controlled means and the advancing means in synchronism, and means for moving the predetermined selecting elements and the selected members to mark the information in a sheet.

34. In a mechanism for marking sheets with information, contacts representing characters, a plurality of marking members representing characters, elements for selecting predetermined marking members, means for advancing the elements into operative association with predetermined marking members, electrical means controlled by the contacts for selectively moving the selecting elements at different moments into operative engagement with the advancing means, means for actuating the electrical means and the advancing means in synchronism, and means for moving the selected selecting elements and the selected members to mark the information in a sheet.

35. An apparatus for recording information on a sheet comprising a plurality of recording members, selecting elements associated therewith, contact making means for storing information, means including a plurality of electromagnets controlled by the contact making means for selectively operating the selecting elements, means operated thereafter for positively advancing the selected elements into operative association with the recording members in accordance with the information stored, and means for causing the selecting elements to actuate the recording members.

36. In an apparatus for recording information on a sheet, a plurality of recording members, selecting means for determining the operation of the recording members, means for conditioning for operation the selecting means, means for moving the selecting means through varying distances dependent upon the moment when the conditioning means operates, and means for actuating the conditioned ones of the selecting means.

37. In an apparatus for recording information on a record, a plurality of recording members, a plurality of elements for selecting the recording members, and means including electrical contacts in which information to be recorded is stored for selecting predetermined elements for operation and controlling the duration of time of operation thereof to select and operate predetermined recording members to record information on a record.

38. In an apparatus for recording information on a record, means for storing the information to be recorded, a plurality of recording members, a plurality of elements for selecting the recording members, means controlled by the storing means for selecting predetermined elements for operation and controlling the duration of time of operation thereof to select and operate predetermined recording members to record the information on a record.

39. In an apparatus for recording information on a record, means for setting up information to be recorded, a plurality of groups of recording members, which groups correspond to the several areas of the record, selecting means associated with each group of recording members, a plurality of devices controlled by the setting-up means for conditioning the selecting means for subsequent operation, means for actuating the selecting means to effect the selection and operation of the recording members, and means operative to permit the setting-up means to control any of said devices to effect the recording of the information in any desired area on the record.

40. In an apparatus for recording information in a sheet, a plurality of groups of recording members, a plurality of groups of manually operable keys, means for rendering any group of keys individual to any one of said groups of recording members, selectors for selecting the recording members to be operated, and timing mechanism for controlling all of said groups of recording members in accordance with the operation of said keys by controlling the duration of time of operation of the selectors in a continuous action.

41. In a combination, a plurality of groups of perforating members, a plurality of groups of keys, each group of keys being individual to one of said groups of perforating members, said keys being arranged so that only one key in each group is operated at any one time for selecting a perforating member in the group thereof corresponding to each key, and electrically controlled means operative following the operation of said keys for selecting and simultaneously operating all selected perforating members.

42. In a perforator comprising a plurality of groups of keys, electromagnetic means individual to each group of keys, perforating mechanism arranged to be selectively controlled by said electromagnetic means, said keys adapted to be operated successively, means for transferring the key records within the cyclic time of the device to said electromagnetic means to prepare selectively said perforating mechanism for operation, means for restoring said keys to normal, means for operating the punches, and means for restoring the electromagnetic means to normal for reoperation in accordance with new operations of said keys.

43. In a device for perforating sections of a strip, a punching mechanism, selecting means for the punching mechanism, a plurality of means for setting up and retaining the data to be punched, and electrical means for causing the selective conditioning of said data setting and selecting means and for transferring the data within the cyclic time of the device from said setting means to said punching mechanism through the selecting means.

HAROLD GLENN JOHNSTONE.
NORBERT KARL ENGST.